US010863677B2

(12) United States Patent
van Nus et al.

(10) Patent No.: US 10,863,677 B2
(45) Date of Patent: Dec. 15, 2020

(54) BALE SPLITTING ATTACHMENT

(71) Applicant: Tie Down, Inc., Atlanta, GA (US)

(72) Inventors: Warren van Nus, Lawrenceville, GA (US); Kenneth A. Sargent, Villa Rica, GA (US)

(73) Assignee: Tie Down, Inc., Atlanta, GA (US)

( * ) Notice: Subject to any disclaimer, the term of this patent is extended or adjusted under 35 U.S.C. 154(b) by 324 days.

(21) Appl. No.: 15/932,325

(22) Filed: Feb. 16, 2018

(65) Prior Publication Data
US 2018/0220586 A1 Aug. 9, 2018

Related U.S. Application Data

(63) Continuation-in-part of application No. 15/233,626, filed on Aug. 10, 2016, now Pat. No. 10,506,763.

(60) Provisional application No. 62/203,796, filed on Aug. 11, 2015.

(51) Int. Cl.
| A01F 29/08 | (2006.01) |
| A01F 29/01 | (2006.01) |
| A01F 29/00 | (2006.01) |
| B26D 1/16 | (2006.01) |
| B26D 5/12 | (2006.01) |
| B26D 7/02 | (2006.01) |
| B26D 1/20 | (2006.01) |
| B26D 1/08 | (2006.01) |
| B26D 7/01 | (2006.01) |
| A01F 29/14 | (2006.01) |

(52) U.S. Cl.
CPC .......... *A01F 29/08* (2013.01); *A01F 29/005* (2013.01); *A01F 29/01* (2013.01); *B26D 1/08* (2013.01); *B26D 1/16* (2013.01); *B26D 1/20* (2013.01); *B26D 5/12* (2013.01); *B26D 7/01* (2013.01); *B26D 7/02* (2013.01); *A01F 29/14* (2013.01)

(58) Field of Classification Search
CPC ........ A01F 29/08; A01F 29/005; A01F 29/01; A01F 29/14; A01D 87/127; B26D 1/16
USPC ....................................................... 241/605
See application file for complete search history.

(56) References Cited

U.S. PATENT DOCUMENTS

| 3,612,127 A | 10/1971 | Benno |
| 4,411,573 A | 10/1983 | Townsend |
| 4,449,672 A | 5/1984 | Morlock et al. |
| 4,497,163 A | 2/1985 | Ogman |

(Continued)

OTHER PUBLICATIONS

Sargent, Kenneth A.; Supplemental Notice of Allowance for U.S. Appl. No. 15/233,626, filed Mar. 10, 2016, dated Nov. 4, 2019, 6 pgs.

(Continued)

*Primary Examiner* — Faye Francis
(74) *Attorney, Agent, or Firm* — Taylor English Duma LLP

(57) ABSTRACT

A bale splitter attachment for use with a bale including a frame including a frame base and a cutting arm rotatably connected to the frame base at a pivot, the rotatable cutting arm including an elongate blade, the frame base and the rotatable cutting arm together defining a bay to receive the bale; a powered actuation device including a first end connected to the frame base and a second end connected to the rotatable cutting arm at a connection point, the powered actuation device arranged to apply cutting force in a pulling arrangement; and a hook apparatus connected to the frame, the hook apparatus including a plurality of hooks.

12 Claims, 16 Drawing Sheets

(56) References Cited

U.S. PATENT DOCUMENTS

| | | | |
|---|---|---|---|
| 4,549,481 A | 10/1985 | Groeneveld et al. | |
| 4,597,703 A | 7/1986 | Bartolini | |
| 4,771,670 A | 9/1988 | Woerman | |
| 4,923,128 A | 5/1990 | Ostrowski | |
| 4,996,899 A | 3/1991 | Henderson | |
| 5,033,683 A | 7/1991 | Taylor | |
| 5,161,448 A | 11/1992 | Wangsness | |
| 5,242,121 A | 9/1993 | Neier | |
| 5,542,326 A | 8/1996 | Borgford | |
| 5,544,822 A | 8/1996 | Neier | |
| 5,957,025 A | 9/1999 | Buckmaster et al. | |
| 7,377,457 B2 | 5/2008 | Schierman | |
| 7,967,231 B2 | 6/2011 | Post et al. | |
| 8,528,843 B2 | 9/2013 | Murphy | |
| 10,506,763 B2 | 12/2019 | Sargent et al. | |
| 10,647,463 B2 * | 5/2020 | Steenhoek | A01D 87/127 |
| 2008/0041989 A1 | 2/2008 | Schierman | |
| 2011/0155830 A1 * | 6/2011 | Murphy | A01F 29/005 |
| | | | 241/101.73 |
| 2013/0149082 A1 * | 6/2013 | Sheedy | A01D 87/127 |
| | | | 414/412 |
| 2013/0193247 A1 | 8/2013 | Graham | |
| 2017/0042094 A1 | 2/2017 | Sargent et al. | |
| 2018/0016049 A1 | 1/2018 | Schmitz et al. | |

OTHER PUBLICATIONS

Sargent, Kenneth A.; Notice of Allowance for U.S. Appl. No. 15/233,626, filed Aug. 10, 2016, dated Jul. 29, 2019, 5 pgs.

Tanco Autowrap; Brochure for 170 Bale Shear, publicly available prior to Aug. 11, 2015, 2 pgs.

Tanco Autowrap; Brochure for 173 Bale Shear, publicly available prior to Aug. 11, 2015, 2 pgs.

Tanco Autowrap; Brochure for Bale Feeding Solutions, publicly available prior to Feb. 19, 2018, 2 pgs.

Tanco Autowrap; Brochure for Multi Shear, publicly available prior to Feb. 19, 2018, 3 pgs.

Tanco Autowrap; Website for Tanco Autowrap, located at <https://itanco.com/iseries/>, accessed on Jan. 11, 2018, 12 pgs.

Sargent, Kenneth A.; Non-Final Office Action for U.S. Appl. No. 15/233,626, filed Aug. 10, 2016, dated Mar. 20, 2019, 17 pgs.

* cited by examiner

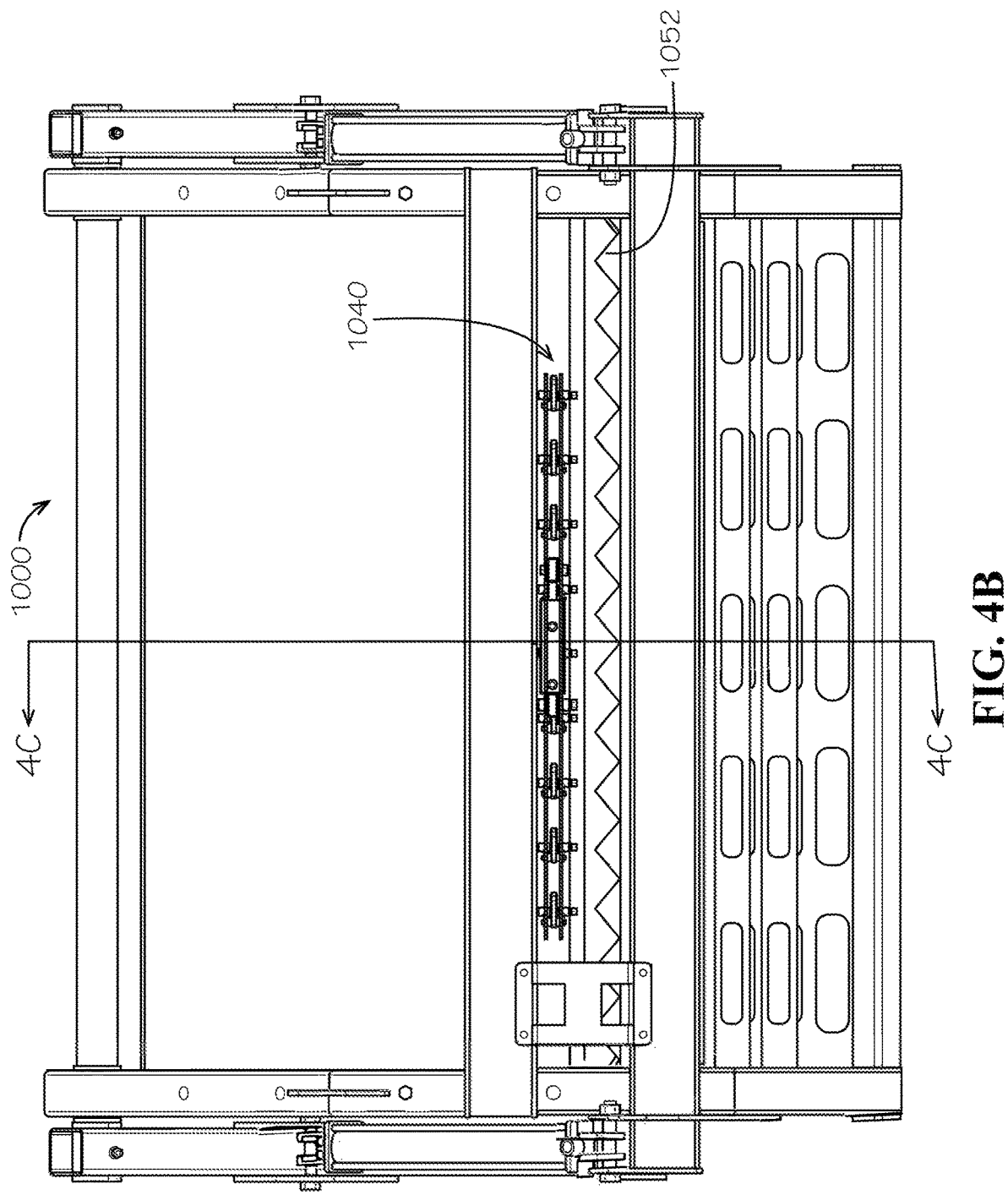

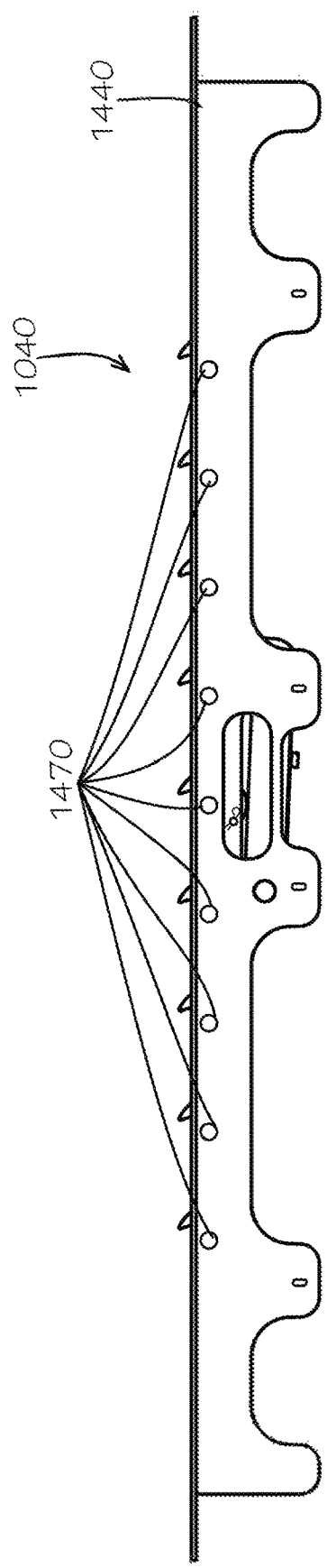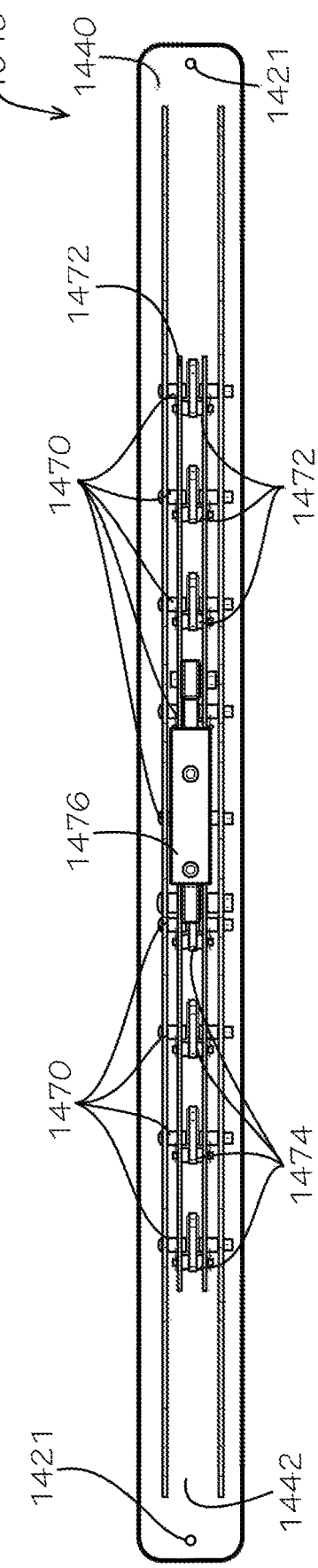
FIG. 5A
FIG. 5B

BALE SPLITTING ATTACHMENT

REFERENCE TO RELATED APPLICATIONS

This application is a continuation-in-part of U.S. application Ser. No. 15/233,626, filed Aug. 10, 2016, bearing U.S. Patent Publication Number 2017/0042094 and entitled "APPARATUS FOR SPLITTING BALES AND RETAINING WRAP," which claims the benefit of U.S. Provisional Application No. 62/203,796, filed Aug. 11, 2015, both of which are hereby specifically incorporated by reference herein in their entireties.

TECHNICAL FIELD

This disclosure relates to agriculture. More specifically, this disclosure relates to handling of bales of agriculture materials.

BACKGROUND

Hay bales and other bales of agricultural materials can be heavy and difficult to handle, even with typical farming equipment. These bales are often enveloped by a thin wrap, such plastic, that can be difficult to separate from the bale in order to remove, spread, or otherwise distribute the agricultural materials.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a bale splitter attachment for use with a bale including a frame including a frame base and a cutting arm rotatably connected to the frame base at a pivot, the rotatable cutting arm including an elongate blade, the frame base and the rotatable cutting arm together defining a bay to receive the bale; a powered actuation device including a first end connected to the frame base and a second end connected to the rotatable cutting arm at a connection point, the powered actuation device arranged to apply cutting force in a pulling arrangement; and a hook apparatus connected to the frame, the hook apparatus including a plurality of hooks.

Also disclosed is a bale splitter assembly including a vehicle, the vehicle including a powered actuation system; a bale splitter attachment, the bale splitter attachment including a frame including a frame base and a cutting arm rotatably connected to the frame base at a pivot, the rotatable cutting arm including an elongate blade, the frame base and the rotatable cutting arm together defining a bay to receive the bale; a powered actuation device, the powered actuation device receiving power from the powered actuation system of the vehicle, the powered actuation device including a first end connected to the frame base and a second end connected to the rotatable cutting arm; and a hook apparatus connected to the frame, the hook apparatus including a plurality of hooks and a powered actuation device, the powered actuation device of the hook apparatus receiving power from the powered actuation system of the vehicle.

Also disclosed is a method of using a bale splitting attachment, the method including the steps of: obtaining a bale splitter, the bale splitter including a frame including a frame base and a cutting arm rotatably connected to the frame base at a pivot, the rotatable cutting arm including an elongate blade, the frame base and the rotatable cutting arm together defining a bay, a powered actuation device including a first end connected to the frame base and a second end connected to the rotatable cutting arm at a connection point, and a hook apparatus connected to the frame, the hook apparatus including a plurality of hooks; picking up a bale, the step of picking up the bale including the steps of arranging the frame in alignment with the bale, engaging the frame over the bale, moving the rotatable cutting arm into an initial position in engagement with the bale, and lifting the bale; moving the bale to a desired location; and splitting the bale, the step of splitting the bale further including the steps of engaging the powered actuation device to arrange the rotatable cutting arm into a middle position, and engaging the powered actuation device to arrange the rotatable cutting arm into a completed position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 4B is a rear side view of the bale splitter of FIG. 4A.

FIG. 5A is a top side view of a hook apparatus for use with the bale splitter of FIG. 1A in accord with one aspect of the current disclosure.

FIG. 5B is a rear side view of the hook apparatus of FIG. 5A.

DETAILED DESCRIPTION

Figure 1A:
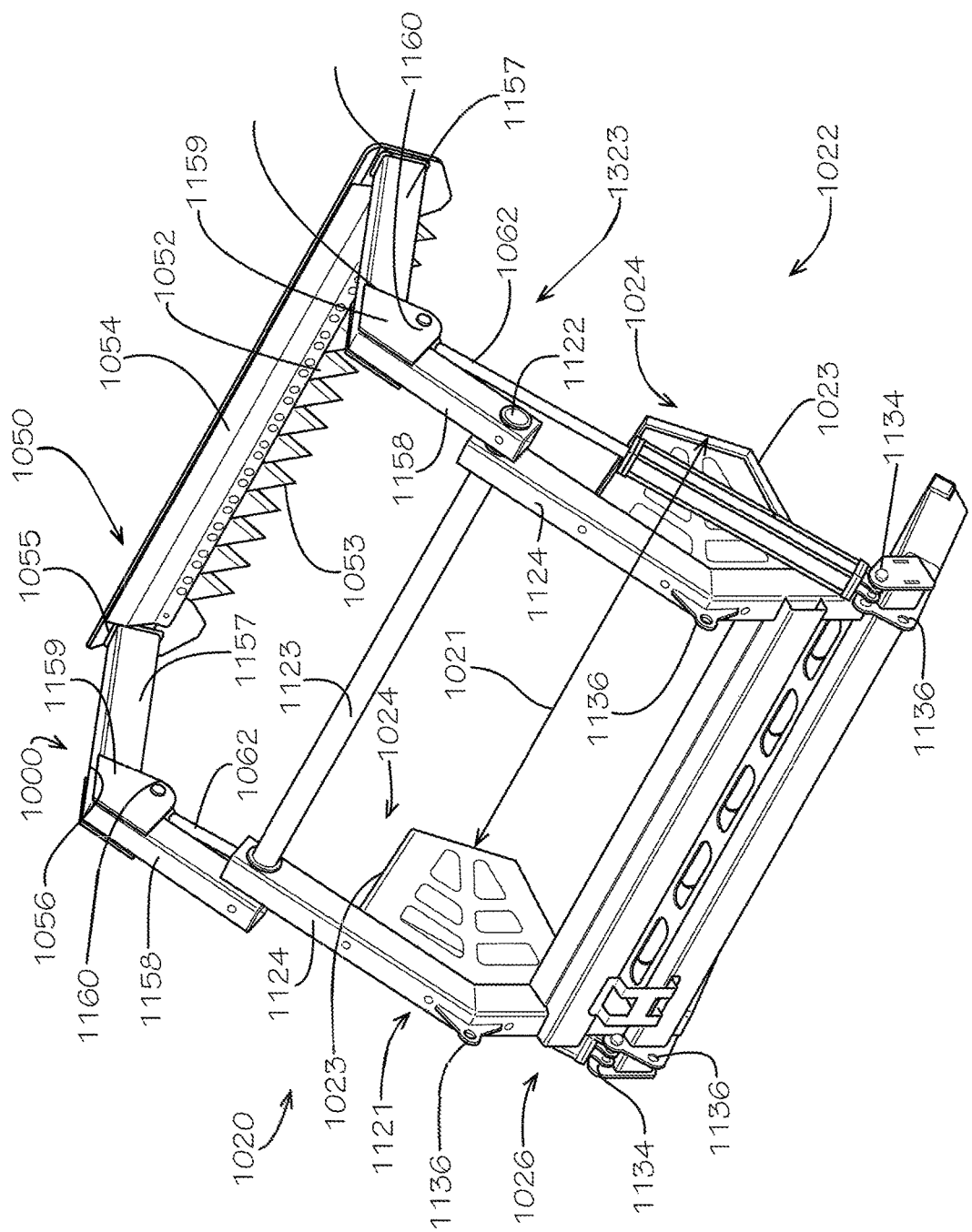
FIG. 1A is a perspective view of a bale splitter attachment in an initial position in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is an apparatus for splitting bales and associated methods, systems, devices, and various apparatus. It would be understood by one of skill in the art that the disclosed bale splitter is described in but a few exemplary embodiments among many. No particular terminology or description should be considered limiting on the disclosure or the scope of any claims issuing therefrom.

One embodiment of a bale splitter attachment 1000 is disclosed and described with reference to FIGS. 1A-1D. As seen with reference to FIG. 1A, a bale splitter attachment 1000 (also referred to as a "bale splitter" within this disclosure) can be adapted for handling bales, traditionally hay bales, straw bales, corn stalk bales, or other similar bales of agricultural materials. One of skill in the art would understand that the specific materials to be handled should be considered non-limiting on the scope of the disclosure. The bale splitter attachment 1000 can be adapted to be attached to a vehicle such as a skid steer loader or to another similar industrial machinery such as a backhoe, front end loader, track loader, or various other machinery in various applications as understood by one of skill in the art. Typically, bales in the industry can be covered, wrapped, collected, or bound with twine, netting, wrapping such as plastic wrapping, or a variety of material wrappings or hinders known in the art.

The bale splitter 1000 can include a frame 1020 having a forward end 1022 that can be open and thereby define a bay 1323 to receive the wrapped bale, a back end 1026 having a rear framework adapted for attachment to the vehicle, sides defined by two side frames 1024, and a width 1021 between the two side frames 1024 that can be sufficient to receive the length of the wrapped bale. In one aspect, each of the side frames 1024 can comprise at least one vertical plate 1023 to retain the bale. Each vertical plate 1023 can be arranged on a bale-ward side of a powered actuation device 1062, thereby protecting the powered actuation device 1062 from potentially damaging interaction with the bale.

Figure 1B:
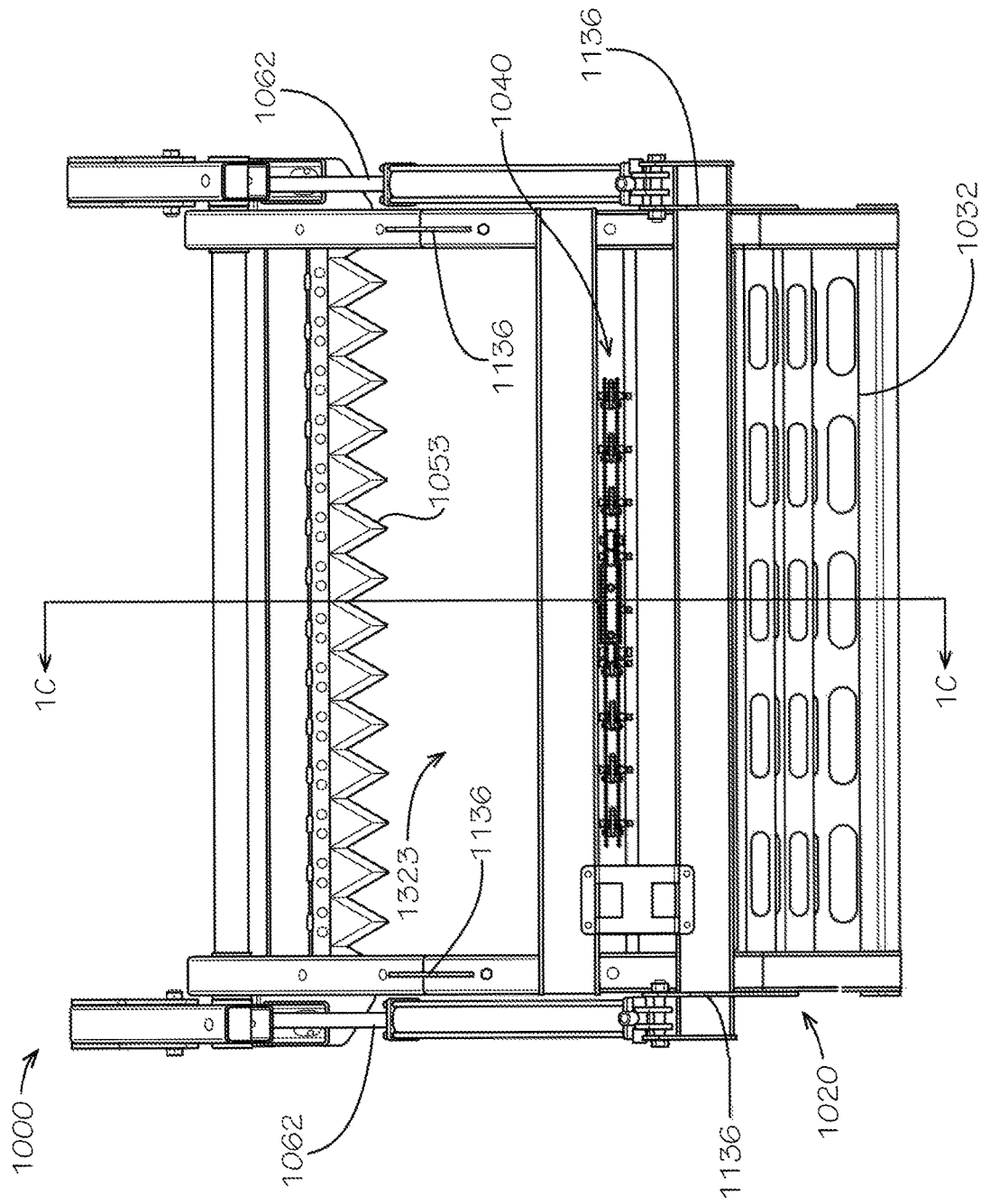
FIG. 1B is a rear side view of the bale splitter attachment of FIG. 1A.

As seen with reference to FIG. 1B, the frame 1020 can further comprise an inner framework 1032 to support the bale. A hook apparatus 1040 can be positioned at a position on the back end 1026 of the frame 1020 proximate an inner end of the bay 1323. As described later in this disclosure, the hook apparatus 1040 can comprise an elongate hooking mechanism itself comprising a plurality of hooks that sweep through apertures formed in a frame (not shown in the current view) to hook into the wrap of the bale and a thin layer of agricultural material at multiple locations along the length of the hook apparatus 1040. Capturing a portion of the agricultural material together with the wrap can better secure and retain the wrap to the frame 1020 without puncturing the wrap.

With reference to FIGS. 1A-1D, the bale splitter 1000 can include a rotatable cutting arm 1050 that itself can comprise an elongate blade 1052 secured to a blade support 1054 that extends between blade ends 1055 of a pair of pivot arms 1056. The pivot arms 1056 of the current aspect can include an upper pivot arm 1157 and a lower pivot arm 1158 disposed at an angle to each other. At the joint of the upper pivot arm 1157 with the lower pivot arm 1158, a joint plate 1159 can comprise a connection point 1160 for the powered actuation device 1062 to the pivot arm 1056. One of skill in the art would understand that the disclosed joining apparatus is but one of many possible joints available, and one can vary the joint without departing from the scope of the current disclosure. The lower pivot arm 1158 of the pivot arm 1056 can be rotatably attached to a frame base 1121 at a frame base arm 1124 that can comprise the portion of the frame 1020 connected to the vehicle. The rotatable attachment can occur at a pivot 1122 that can be coincident with a roll bar support 1123 that can itself connect the frame base arms 1124 with each other. As can be seen, a length of the lower pivot arm 1158 can at least partially define the mechanical advantage of the powered actuation device 1062, as the moment arm of the powered actuation device 1062 can apply from the pivot 1122 proximate one end of the lower pivot arm 1158 to the connection point 1160 proximate the other end of the lower pivot arm 1158.

The blade 1052 can comprise a serrated cutting edge 1053, as will be discussed in greater detail later in this disclosure. The serrated cutting edge 1053 can comprise a plurality of points across the length thereof. The points can pierce first through the wrap and into the bale so that the trailing diagonal edges cut through the agricultural material while effectively sliding across the agricultural material at an angle as they are moved downward through the bale. This can generate a more effective and efficient cutting motion that can reduce the power requirements for splitting the bale and can result in a more complete cut. In one aspect the elongate cutting blade 1052 can also be formed from separate blade segments with triangular tips that are aligned together and mounted side-by-side to the blade support 1054 to form the assembled elongate cutting blade 1052. This can allow for the independent removal of each blade segment so that the diagonal edges can be sharpened along their entire lengths.

Each powered actuation device 1062 can connect to the frame base 1121 at a connection point 1134 along an end of the powered actuation device 1062. The powered actuation device 1062 can pivot as necessary to accommodate the motion of the pivot arms 1056. The powered actuation device 1062 can comprise substantially similar systems and apparatus to those disclosed with respect to application U.S. application Ser. No. 15/233,626, filed Aug. 10, 2016, bearing US Patent Publication Number 2017/0042094 and entitled "APPARATUS FOR SPLITTING BALES AND RETAINING WRAP," which is incorporated by reference herein in its entirety.

It has surprisingly been discovered that advantages can exist arranging the powered actuation devices 1062 in an arrangement to experience maximum loading—or, in other words, during the bale-cutting process—in a "pulling" arrangement. Although maximum force load applied on the bale from the powered actuation device 1062 can be smaller as compared to a "pushing" arrangement, the pulling arrangement can reduce the amount of stress on various joints and connection points of the frame 1020, frame base 1121, and pivot arms 1056. Additionally, because the pulling arrangement can naturally cause a clamping action, actuation of the clamping/cutting action of the rotatable cutting arm 1050 can be achieved without the need for apparatus to create a mechanical advantage thereby providing reduced apparatus, which in turn can reduce weight of the bale splitter 1000 as compared to prior versions. Additionally, because of the reduced stresses on various components of the bale splitter 1000, the frame 1020, the frame base 1121, and the pivot arms 1056 can be fabricated of tube steel or other components of similar construction. The reduction of materials needed to fabricate the bale splitter 1000 can reduce fabrication costs and can reduce weight of the bale splitter 1000 as compared to prior versions, which potentially required construction from monocoque steel or other heavier materials.

Figure 1C:
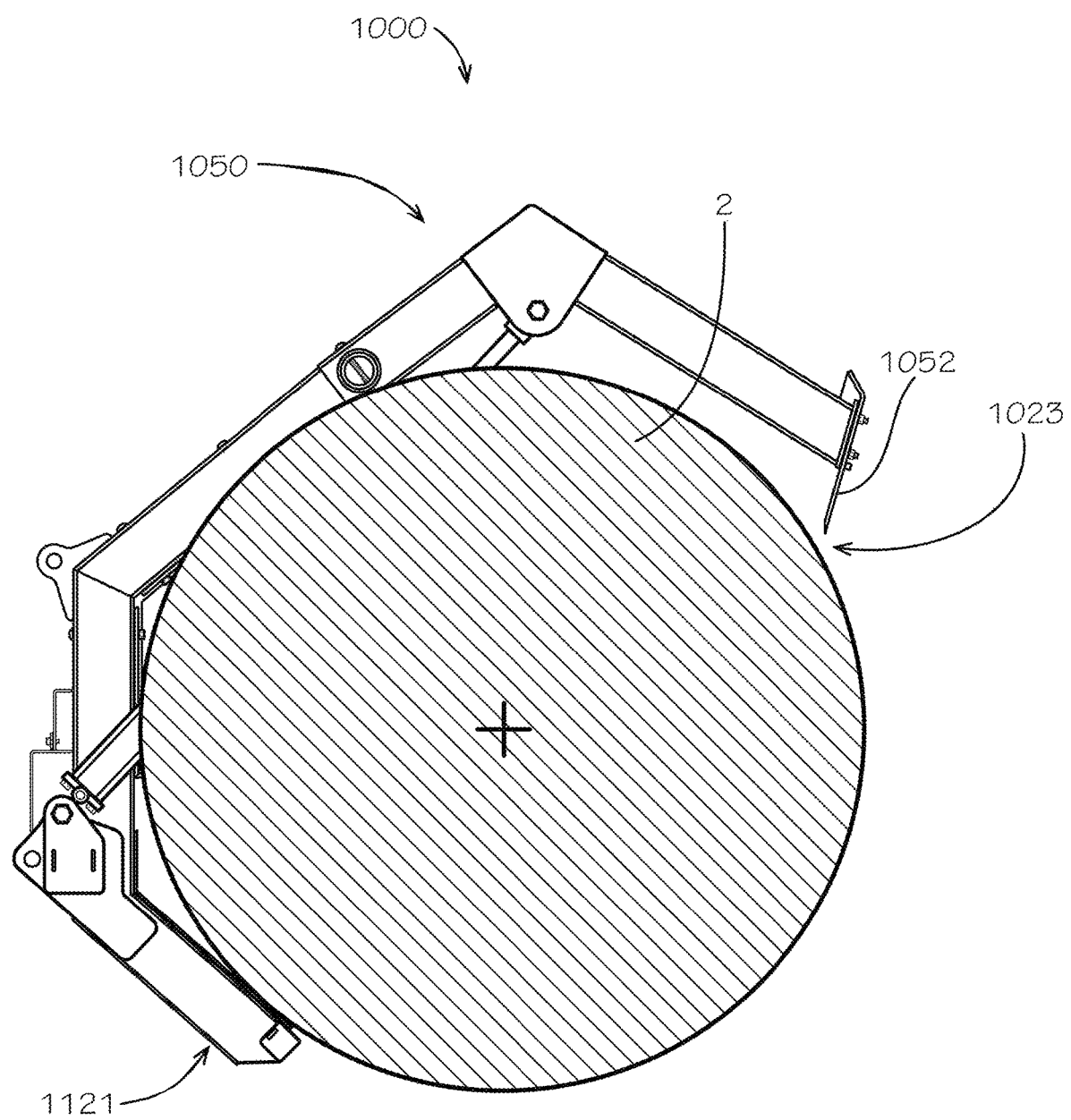
FIG. 1C is a cross-sectional view of the bale splitter attachment of FIG. 1B taken along the plane indicated by line 1C-1C, further including a bale.
Figure 1D:
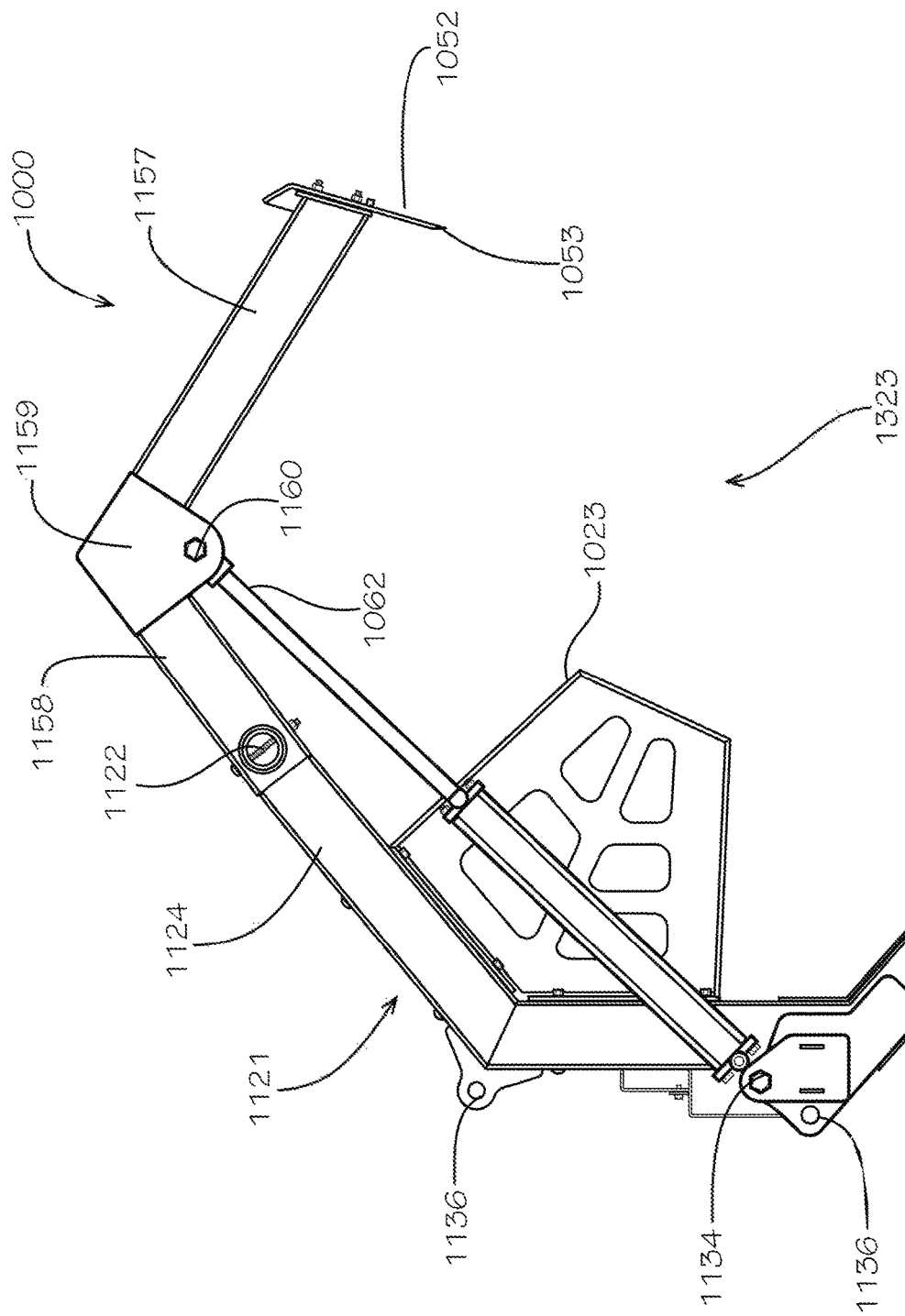
FIG. 1D is a first side view of the bale splitter attachment of FIG. 1A.

As seen with reference to FIG. 1D, the bale splitter 1000 can include mounts 1136 for attachment to the vehicle. Each mount 1136 can comprise a hole defined within a mounting plate that can be affixed to, attached to, or integrally created with the frame base 1121. Each hole can be arranged to connect to the vehicle using a fastener. One of skill in the art would understand that additional fastening means would be contemplated as known in the art, and various fastening apparatus can be utilized without departing from the scope of the current disclosure.

In contrast with some aspects of the prior disclosure, in the current aspect, the hook apparatus 1040 can be actuated independently of the powered actuation device 1062 such that an operator of the bale splitter 1000 can independently control the hooking features and the cutting features of the bale splitter 1000. Independent control can be achieved by an operator of the vehicle pushing a button that can allow hydraulic or powered control to be switched from the powered actuation device 1062 to the hook apparatus 1040. In various apparatus, two separate powered actuation systems can be included to control the hook apparatus 1040 and the powered actuation device 1062 separately.

The bale 2 can be loaded within the bale splitter 1000 as shown in FIG. 1C. In one aspect of the current disclosure, control of the bale 2 can be achieved by arranging the bale splitter 1000 such that the bale 2 can be arranged in the bay 1323. The rotatable cutting arm 1050 can be rotated toward the bale 2 such that the blade 1052 can come into contact with the bale 2 but with insufficient cutting force to split the bale 2. As such, the bale 2 can become clamped between the rotatable cutting arm 1050 and the frame base 1121 for transportation and handling.

Figure 2:
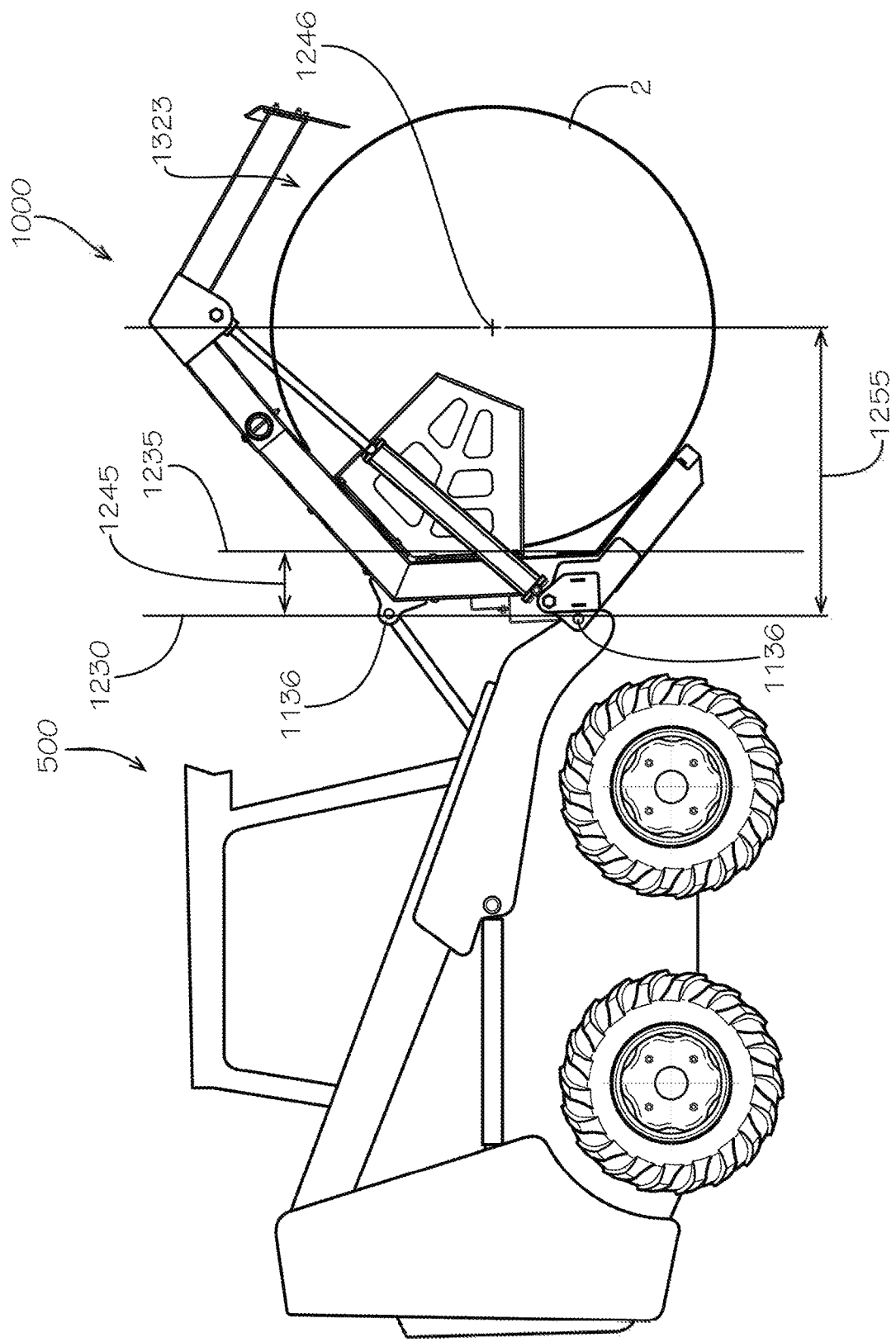
FIG. 2 is a side view of the bale splitter attachment of FIG. 1A including a bale and attached to a vehicle in accord with one aspect of the current disclosure.

As seen with reference to FIG. 2, the vehicle 500 can be connected to the bale splitter attachment 1000 along the mounts 1136. In the current aspect, the vehicle 500 can be represented by a skid steer loader, although various vehicles as previously discussed can be implemented in accord with the scope of the current disclosure.

One advantage that the current aspect can produce over prior implementations of bale splitters can be the physical proximity of the bale 2 to the vehicle 500 during handling. For use in various applications, the vehicle 500 can transport the bale 2, which itself can be too heavy for manual manipulation, as bales of agricultural material can range in weight from 450 pounds to over 1700 pounds depending on size and density. During handling, the bale 2 can produce a tipping moment that, in various situations, can cause the vehicle 500 to experience tipping. The tipping moment can be especially extreme if the bale 2 is held and manipulated far from the vehicle 500 as the moment arm to the bale 2 can be increased. Additionally, heavy constructions of prior bale splitters can exacerbate the problem.

In measuring some benefit that the bale splitter 1000 can introduce of prior aspects, it can be advantageous to examine the position of the bale 2 relative to the vehicle 500. A mount plane 1230 can be defined as a plane that bisects the mounts 1136. A bale edge plane 1235 can be defined parallel to the mount plane 1230 and tangent to an edge of the bale 2. A bale center plane 1240 can be defined parallel to the mount plane 1230 and the bale edge plane 1235 and bisecting a center point 1246 (also known as the "core") of the bale 2. The location of the bale 2 inside the bay 1323 can be described with reference to the various planes mentioned herein. An edge plane distance 1245 can be defined as the orthogonal distance between the mount plane 1230 and the edge plane 1235. A center plane distance 1255 can be defined as the distance between the mount plane 1230 and the center plane 1240. In various aspects, the center plane distance 1255 can be about the same as the edge plane distance 1245 along with a radial measurement of the size of the bale 2. For example, for a 6-foot bale (meaning a bale of about six feet in diameter), the center plane distance 1255 can be about the same as the edge plane distance 1245 plus about three feet. In the current aspect, the edge plane distance 1245 can be about 1 foot. In various aspects, the edge plane distance 1245 can be less than or about 9 inches. In various aspects, the edge plane distance 1245 can be less than or about 18 inches. In various aspects, the edge plane distance 1245 can be less or about 2 feet.

In various aspects, the distances 1245, 1255 can be discussed relative to the size of the bale. In quantifying the value of the measure, it can be important to discuss as an intended bale size as values may vary between a 6-foot bale, a 5-foot bale, and a 4-foot bale, for example. It can be helpful to provide a distance ratio. When discussing center plane distance 1255, the ratio of the center plane distance 1255 to the intended bale size can be termed the center plane distance ratio, or $R_{CP}$, as a ratio of the center plane distance 1255 to the radius of the intended bale size. When discussing edge plane distance 1245, the ratio of the edge plane distance 1245 to the intended bale size can be termed the edge plane distance ratio, or $R_{EP}$, as a ratio of the edge plane distance 1245 to the radius of the intended bale size. The center plane distance 1255 in the current aspect can define a $R_{CP}$ of about 1.25 for a 6-foot intended bale size. In various aspects, $R_{CP}$ of the current aspect can be less than or equal to about 1.33 for a 6-foot intended bale size. Numbers can be different with $R_{EP}$ because the edge plane distance 1245 can be much smaller than other distances. As such, $R_{EP}$ can in the current aspect can be about 0.5 when the edge plane distance is 18 inches, about 0.33 when the edge plane distance is 12 inches, or less than 0.25 in various aspects when intended bale size is 6 feet.

The smaller the ratios $R_{CP}$ and $R_{EP}$ as compared to average values, the less likely the vehicle 500 is to tip when in use. As such, the arrangements of the bale splitter 1000 can provide advantages in stability and maneuverability not seen in prior designs. Also, as previously mentioned, the bale splitter 1000 itself can also be lighter than many of the prior designs, which can itself aid in stability. It would also be appreciated by one of skill in the art that the collection mechanism—specifically, using the rotatable cutting arm 1050 to pick up and maneuver the bale 2—can serve to move the core 1246 of the bale closer to the vehicle 500 (specifically when in use with smaller bales) as compared to prior designs that located all bales in the same location. Moving the bale 2 closer to the vehicle 500 would also be of benefit to prevent tipping moment.

In use, the bale 2 can be collected as described above with reference to the rotatable cutting arm 1050. The bale 2 can be maneuvered and moved to a desired location for splitting. Once located, an operator of the vehicle 500 can choose to engage the hook apparatus 1040 to secure the wrap or baling material, which can prevent its release when the bale 2 is split. Once the hook apparatus 1040 is engaged, the bale 2 can be split according to the process shown and described below. It would be understood by one of skill in the art that engagement of the hook apparatus 1040 is at the option, and in various aspects the hook apparatus 1040 need not be engaged to permit the bale 2 to be split.

The first position for splitting the bale 2 can be seen by way of reference to FIGS. 1A-1D and FIG. 2, as previously discussed. This can be termed the "initial" position where the bale 2 can be arranged and located for later splitting. The bale 2 can also be transported and manipulated in this position as previously described.

A "middle" position can be seen with reference to FIGS. 3A-3D. As seen, each powered actuation device 1062 can be actuated to begin the bale-splitting process. With each powered actuation device 1062 actuated, the rotatable cutting arm 1050 can be draw into the bale 2 with the elongate blade 1052 piercing through the bale 2 and releasing the agricultural material. During the process of initially piercing the bale 2, the elongate blade 1052 can cause the wrapping—typically plastic wrap, mesh, netting, twine, or baling wire—to be cut and separated from the bale 2. The cutting of the wrapping can aid in releasing the baled agricultural material. As previously mentioned, the hook apparatus 1040 can be engaged to capture the wrapping secured to the frame base 1121 to prevent the wrapping from becoming entangled or deposited with the agricultural material.

Figure 3A:
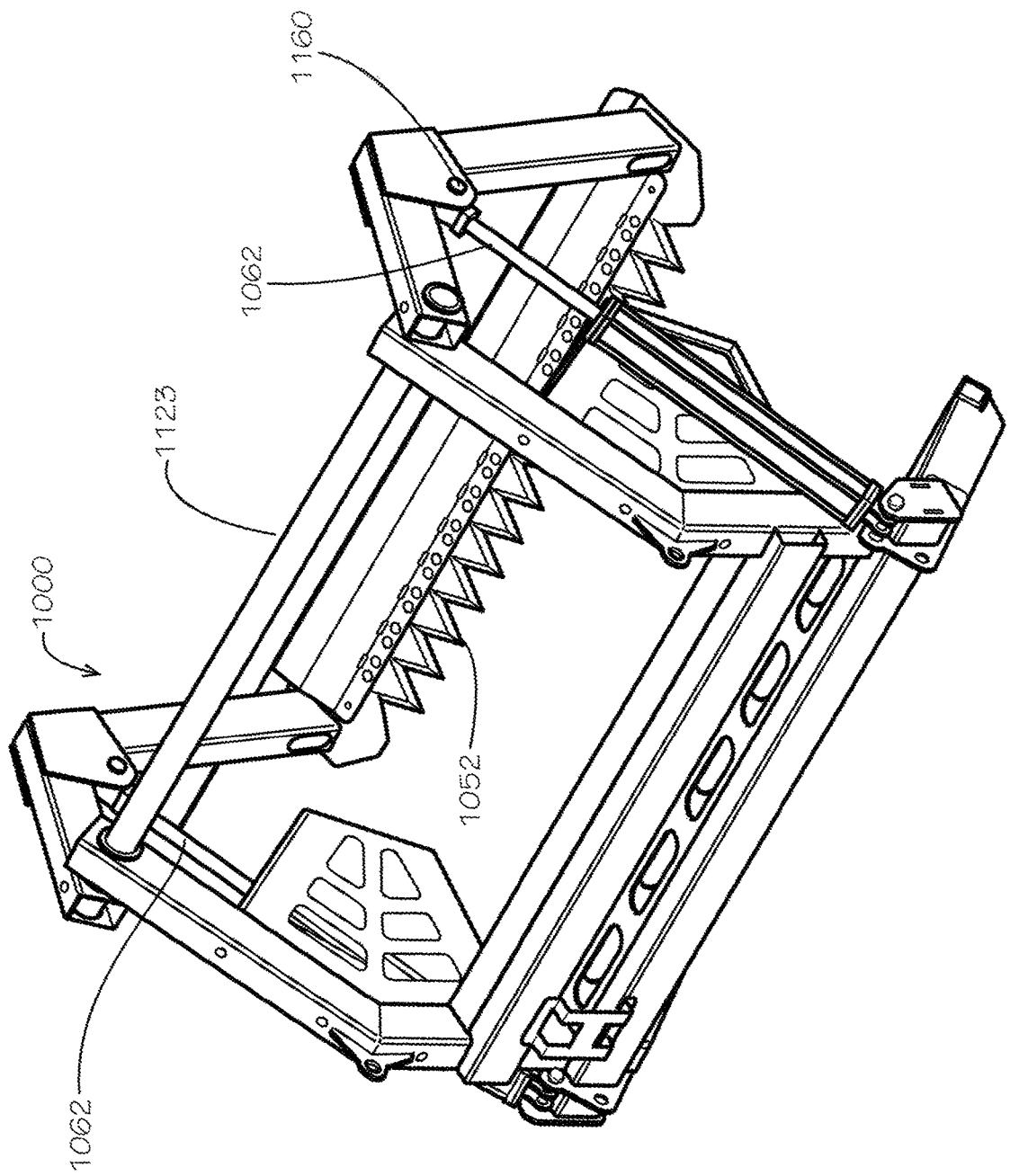
FIG. 3A is a perspective view of the bale splitter attachment of FIG. 1A in a middle position.
Figure 3B:
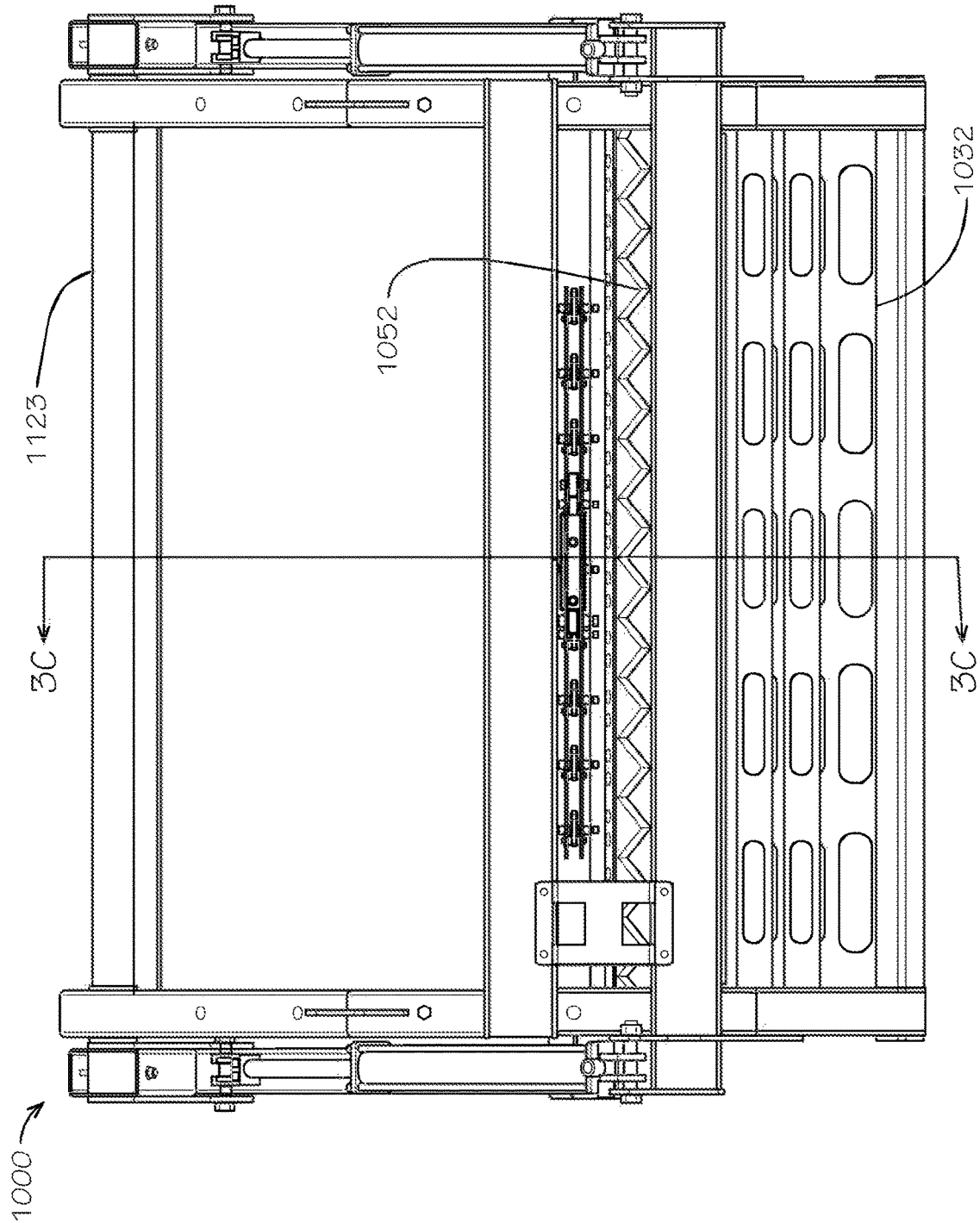
FIG. 3B is a rear side view of the bale splitter of FIG. 3A.
Figure 3C:
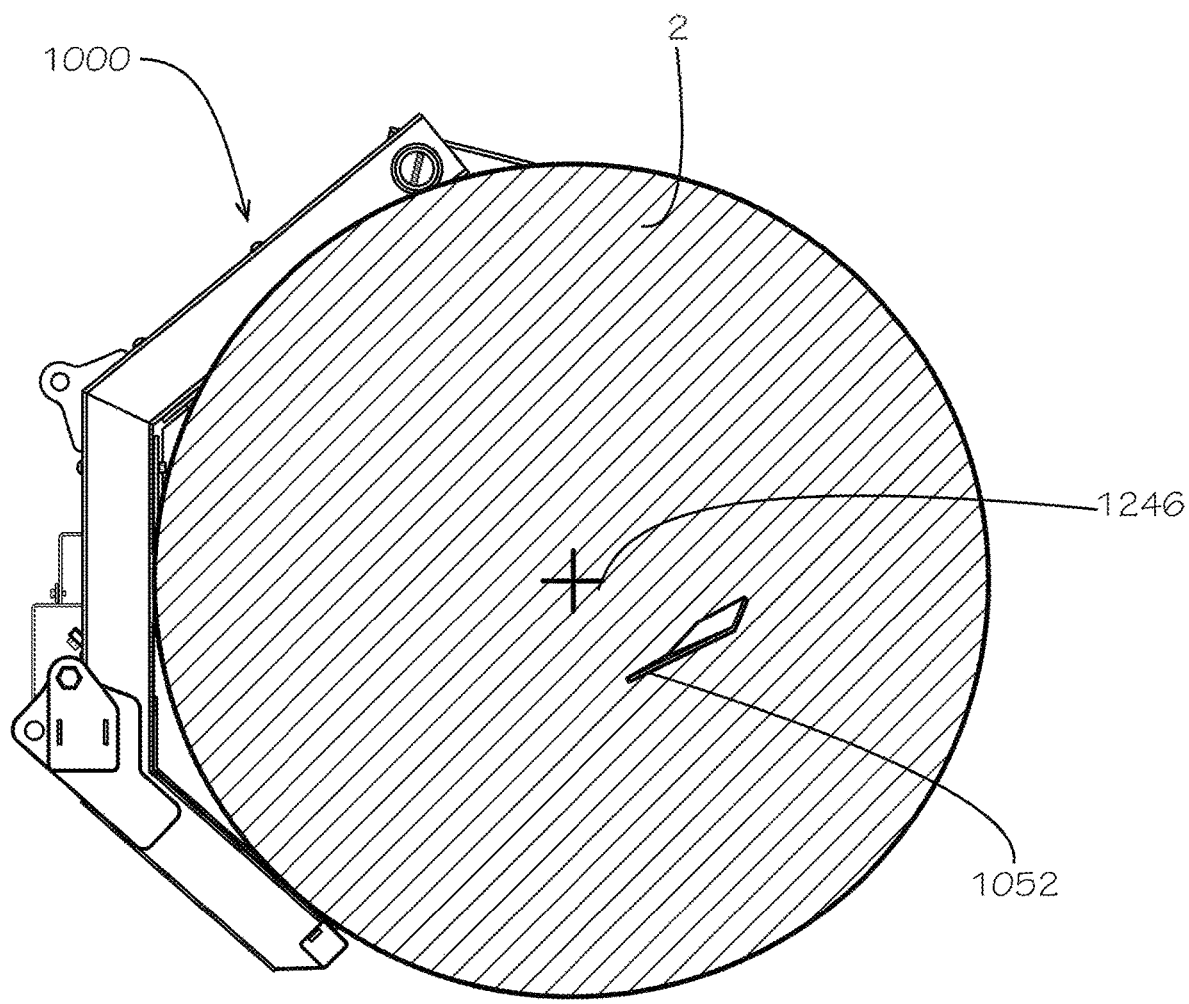
FIG. 3C is a cross-sectional view of the bale splitter attachment of FIG. 3B taken along the plane indicated by line 3C-3C, further including a bale.
Figure 3D:
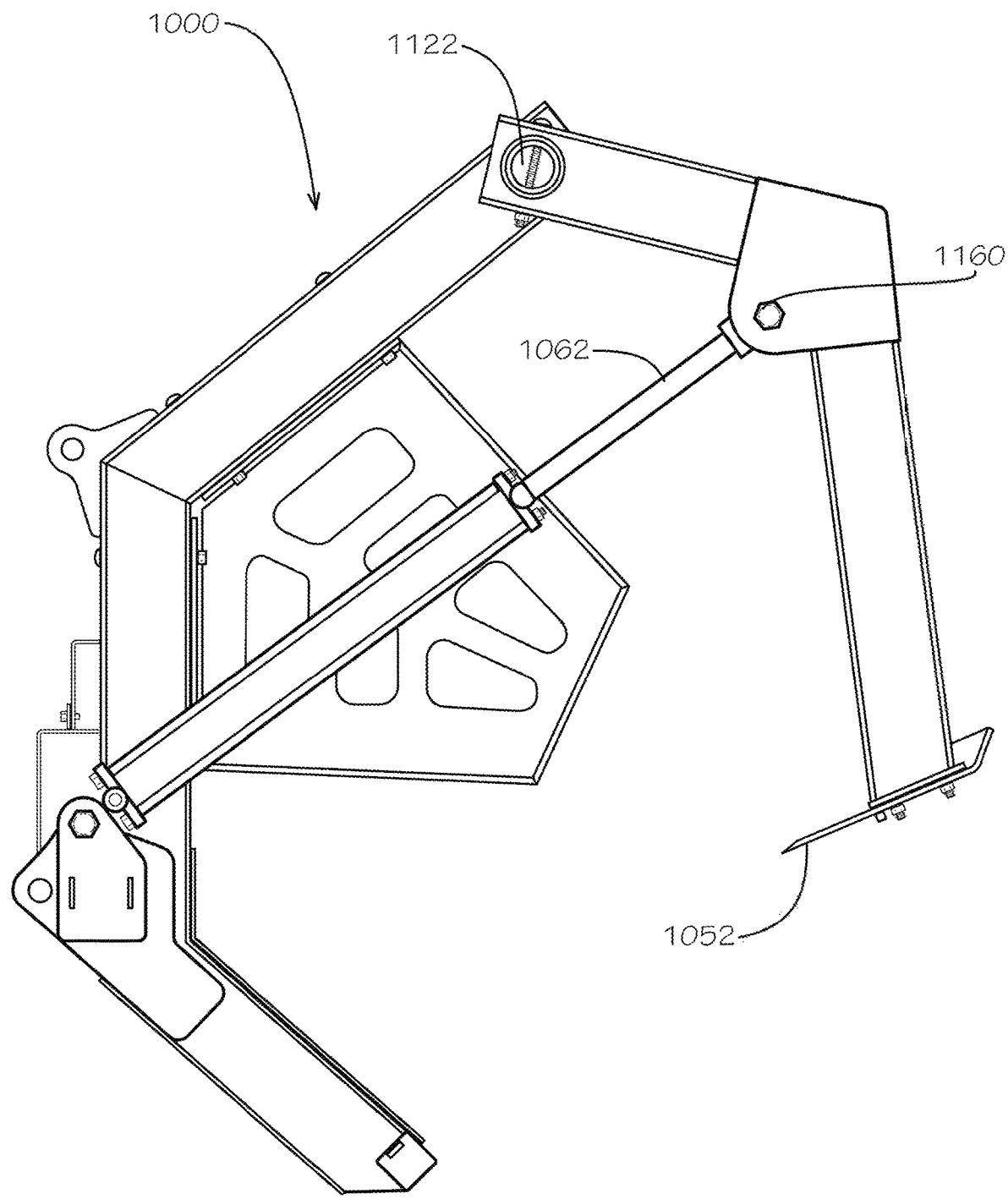
FIG. 3D is a first side view of the bale splitter attachment of FIG. 3A.
Figure 4A:
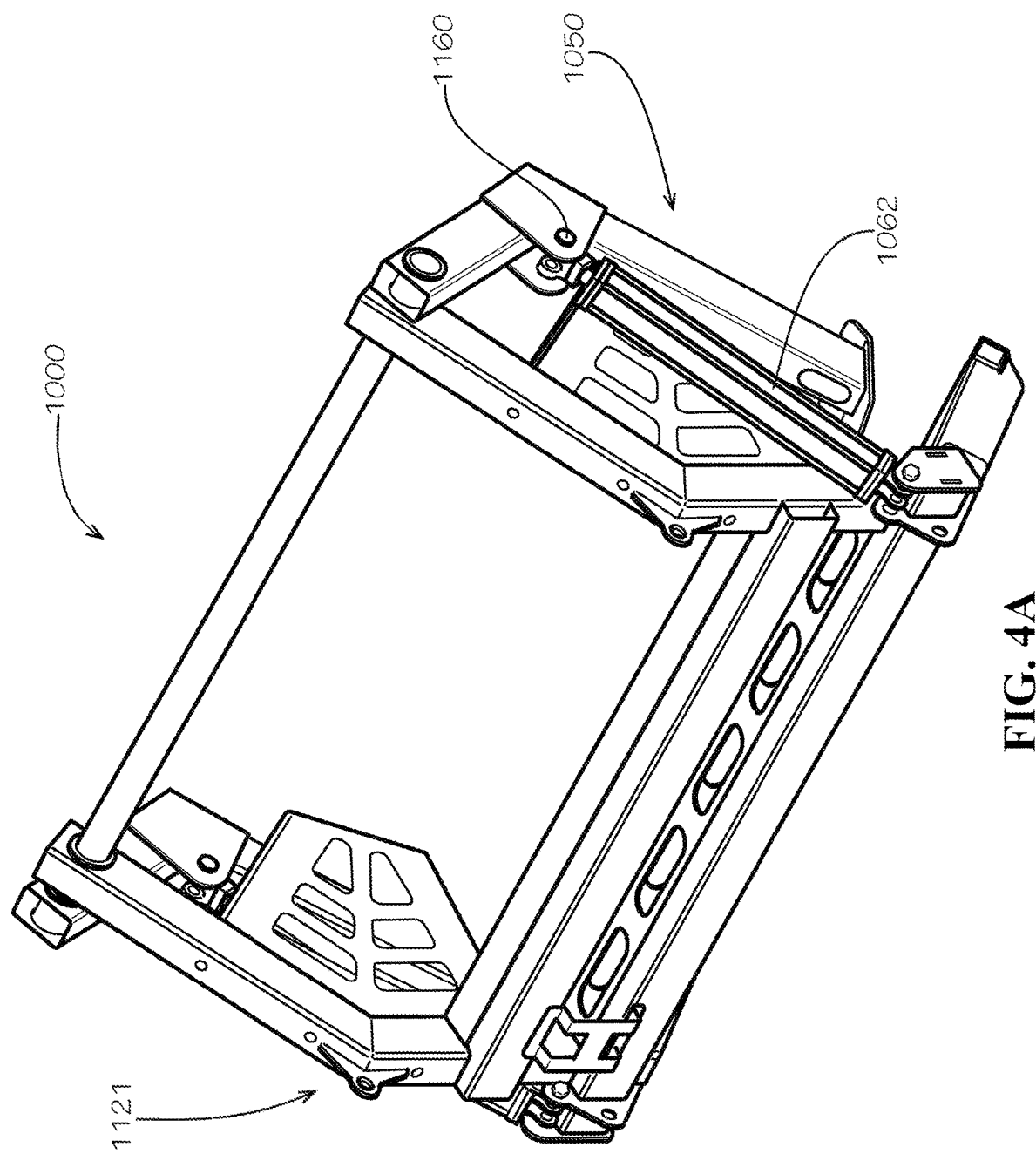
FIG. 4A is a perspective view of the bale splitter attachment of FIG. 1A in a final position.
Figure 4C:
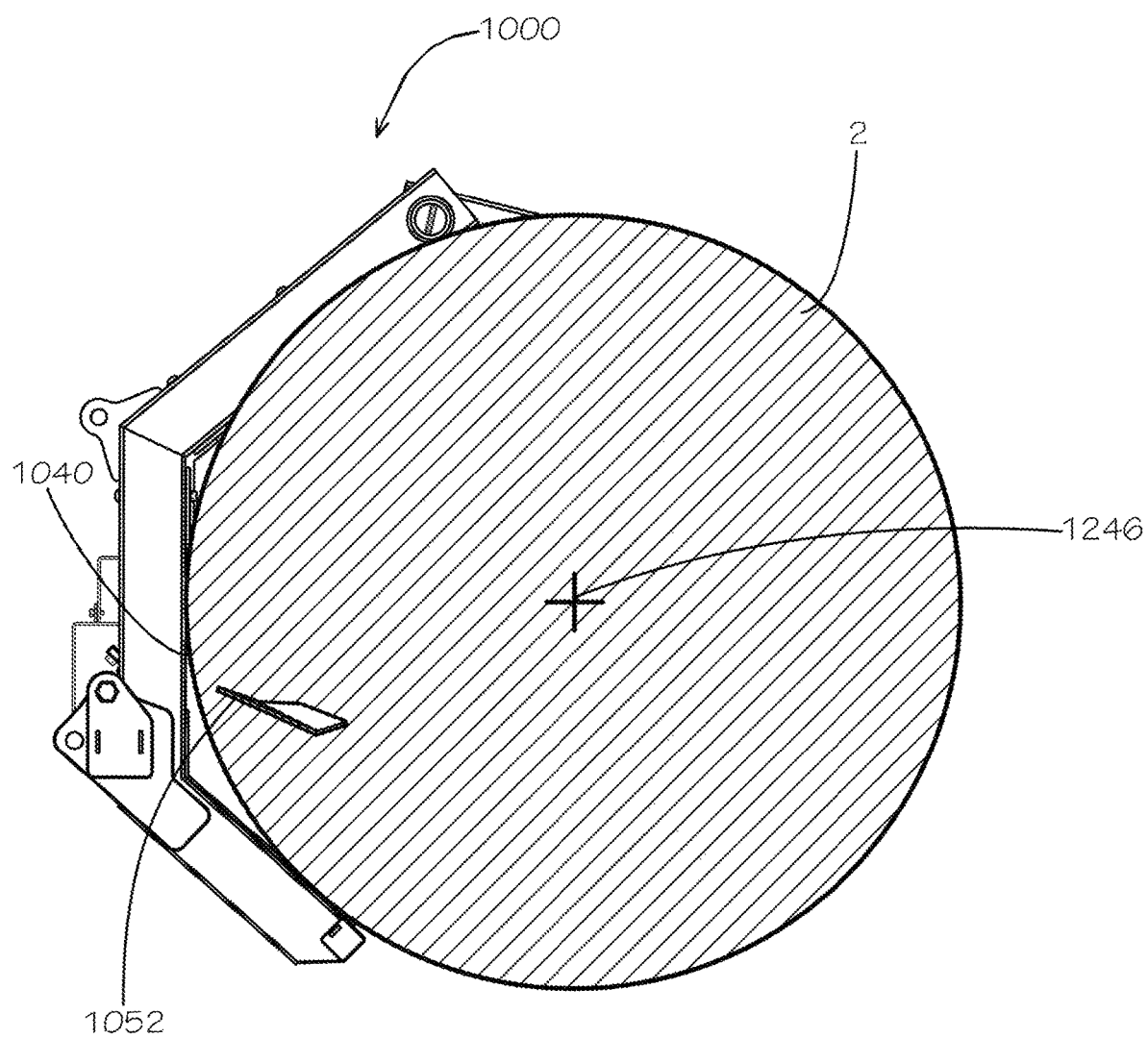
FIG. 4C is a cross-sectional view of the bale splitter attachment of FIG. 4B taken along the plane indicated by line 4C-4C, further including a bale.
Figure 4D:
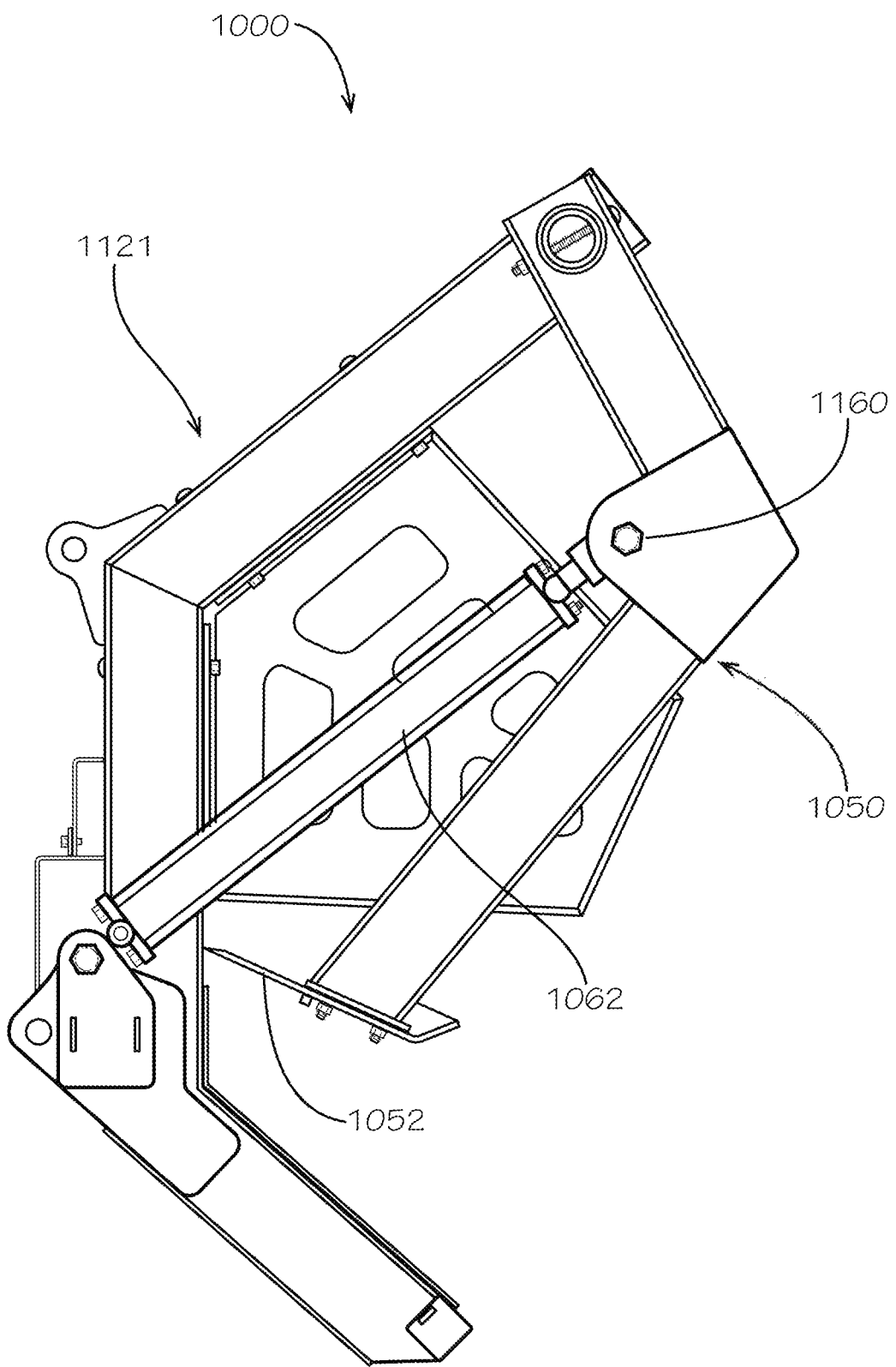
FIG. 4D is a first side view of the bale splitter attachment of FIG. 4A.
Figure 5C:
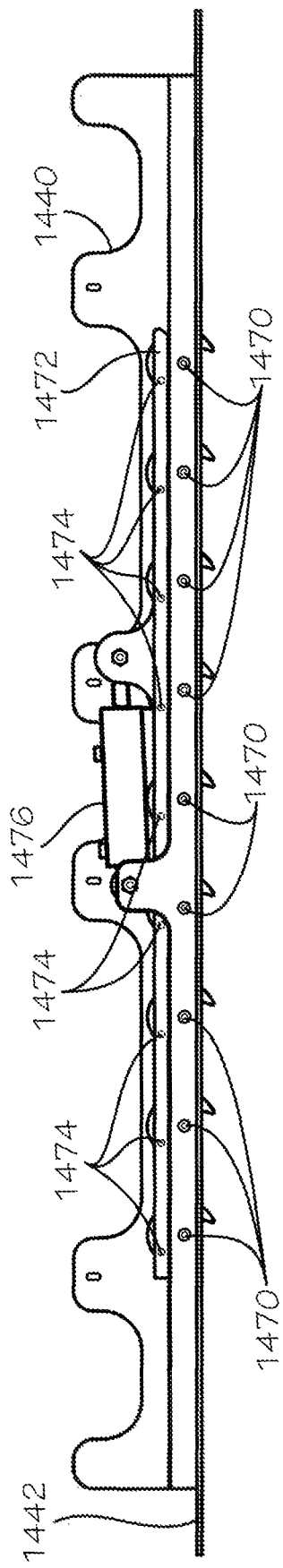
FIG. 5C is a bottom side view of the hook apparatus of FIG. 5A.
Figure 5D:
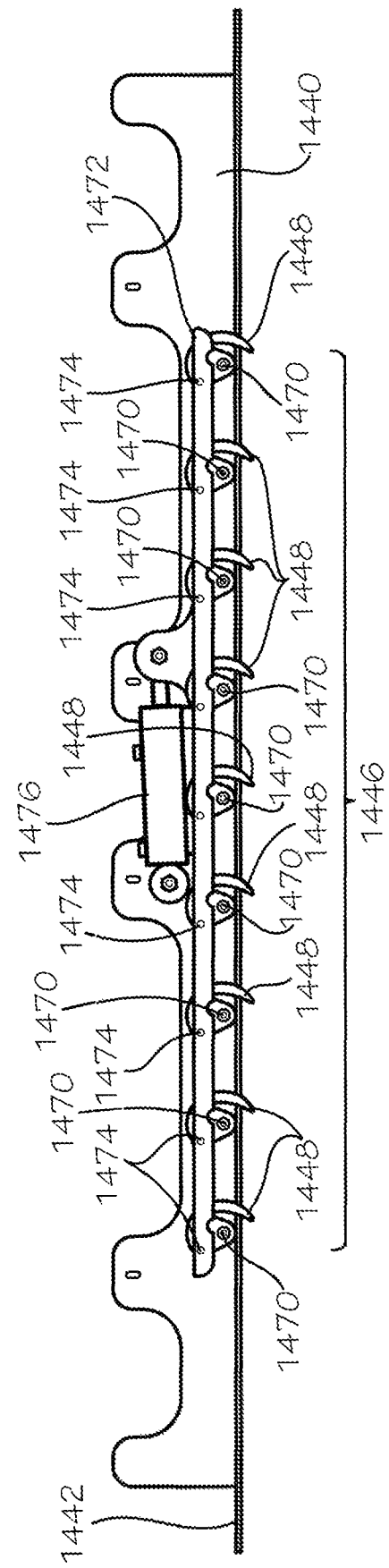
FIG. 5D is a cutaway bottom side view of the hook apparatus of FIG. 5C.

As seen with specific reference to FIG. 3D, in the "middle" position the powered actuation device 1062 can be arranged to be in its maximum mechanical advantage, as the rotation of the pivot arms 1056 can position the connection point 1160 at its maximum distance from the pivot 1122 at this position, providing the largest moment arm about the pivot 1122 and thereby creating the largest mechanical advantage. It can be of particular advantage to have the largest mechanical advantage at a position coincident with a cut proximate the core 1246 of the bale 2, as the core 1246 tends to be hard and difficult to cut. It would be noted by one of skill in the art that the travel of the elongate blade 1052 can be arranged such that it does not directly impact the core 1246, thereby reducing the power needs on the powered actuation device 1062.

A "final" or "completed cut" position can be seen with reference to FIGS. 4A-4D. In the final position, the rotatable cutting arm 1050 can be actuated completely such that the elongate blade 1052 can rest partially against or in close proximity to the frame base 1121. The powered actuation device 1062 can be arranged in a fully contracted position, although in various aspects the powered actuation device 1062 can be arranged such that it has additional travel beyond the "final" position to ensure complete cutting power. As can be seen with reference to FIGS. 4B-4D, the elongate blade 1052 can be arranged to avoid contact with the hook apparatus 1040.

Once the completed cut position is achieved, the bale 2 can be completely cut. As such, the bale 2 can be arranged to disintegrate as desired—for example, for feeding or bedding purposes depending on the agricultural material chosen, among other purposes. The wrapping can be maintained in contact with the hook apparatus 1040 until discarding of the wrapping is desired, at which point the vehicle operator can disengage the hook apparatus 1040 to release the wrapping.

As seen with reference to FIGS. 5A-5D, the hook apparatus 1040 that can function similarly to those previously described with reference to U.S. application Ser. No. 15/233,626, filed Aug. 10, 2016, bearing US Patent Publication Number 2017/0042094 and entitled "APPARATUS FOR SPLITTING BALES AND RETAINING WRAP," which is incorporated by reference herein in its entirety.

The hook apparatus 1040 can comprise a plurality of hook plates 1446 that are each rotatably supported on bearings or journals 1470 connected to a hook frame 1440. Each of the hook plates 1446 generally can include a hook 1448 and an aperture that can receive a pin 1474 which can also extend through apertures formed in a shuttle 1472. A linear actuator 1476 can be coupled at one end to the shuttle 1472 and can be coupled at the other end to the hook frame 1440, allowing linear actuation of the shuttle. In one aspect the linear actuator 1476 can be another hydraulically-operated power cylinder The hook apparatus 1040 can comprise nine (9) hook plates 1446 that are substantially evenly distributed along the length of the hook apparatus 1040 and can provide nine separate and evenly-spaced points of attachment along the length of the bale 2. Nevertheless, it will be appreciated that the configuration of the hook apparatus 1040 is not limited to that shown in the drawing, and that other configurations and aspects are also possible and considered to fall within the scope of the present disclosure.

As illustrated, the apertures in the hook plates 1446 that receive the pins 1474 can be radially offset from the journals 1470 that rotatably support each of the hook plates 1446. The offset can create a camming affect that can cause all of the hooks 1448 to simultaneously sweep through apertures (not shown) in a plate 1442 of the hook frame 1440 when the linear actuator 1476 is activated to pull in or withdraw the shuttle 1472. The pointed tips of the hooks 1448 can easily penetrate through the wrapping and agricultural material of the bale 2. Continued withdrawal of the shuttle 1472 by the linear actuator 1476 can cause the hooks 1448 to arc into and through the agricultural material of the bale 2. Hook plates 1446 can be arranged with a mechanical stop that can prevent over-rotation of the hooks 1448 through the agricultural material.

The bale material (wrapping and agricultural material) that was initially located within a swept length of each hook 1448 can be captured and compressed into a reduced volume of material located under the hook 1448 in its fully extended position. In situations where the wrapping is a plastic sheet, the rotation of the hooks into the bale 2 can first puncture the sheet, after which the compression of the agricultural material against the inside surface of the wrapping can act to distribute the clamping force of the hook 1448 across a larger surface area to prevent the wrapping from tearing further. In situations where the wrapping is a netting, individual strands of the netting may or may not be captured within the reduced volumes under each of the hooks 1448. Even if the strands are not physically captured within the reduced volumes, however, the compression of the adjacent agricultural material that is captured within the reduced volumes can still act to hold the netting strands that fall between the hooks 1448 against the hook apparatus 1040. Thus, the hook apparatus 1040 with its hooking mechanism can reliably capture and secure a wide range of wrap materials and configurations along the length of the bale 2 while simultaneously reducing the likelihood of tearing the wrapping or missing capturing the wrapping altogether. This can be advantageous over prior art clamping devices that merely pinch or clamp the wrap at a single location along the length of the bale 2.

In addition, the percentage of the length of the bale 2 that is swept by the plurality of hooks 1448 can comprise a substantial percentage of the total length of the bale 2. For instance, in one aspect the swept lengths of the plurality of curved hooks 1448 can combine together to define a total swept length that is at least 20% of the length of the bale 2, while in various aspects the total swept length can be greater than 30% of the length of the bale 2.

Additionally, positioning of the hook apparatus 1040 within the bay 1323 can provide advantages not previously understood. In the current aspect, the hook apparatus 1040 can be arranged within the bay 1323 along the frame base 1121 at a position most proximate to the vehicle 500. Additionally, the hook apparatus 1040 can be described as being positioned along the bale edge plane 1235. Vertically, the hook apparatus 1040 can described as being in vertical alignment with the center 1245 of the bale 2 or even above the center 1245 in some aspects.

Some prior designs located hooking mechanisms near the bottom of the bale splitter attachments. Although the hooking mechanisms might secure the wrapping, the location of the hooking mechanism at the bottom of the bale splitter can cause the emptied wrapping to sag below the level of the bale splitter, which can prove problematic in certain applications. When bales are split over a tub grinder, for example, the wrapping can sometimes become entangled with the grinding mechanism, leading to various problems including wrapping being integrated with feed and damage to the tub grinder, among others. By arranging the hook apparatus 1040 at a rear end of the bay 1323, the wrapping can be secured at a location higher than previous aspects of the disclosure. As a result, the wrapping is less likely to hang significantly below the bale splitter 1000, meaning it is less likely to come into interaction with the ground or with additional apparatus, such as a tub grinder.

In the current aspect, the hook apparatus 1040 can be attached to the frame base 1121 using fasteners at fastener apertures 1421. Various fasteners may be utilized as would be understood by one of skill in the art. One advantage of the hook apparatus 1040 over prior designs is the removability of hook apparatus 1040. Should the hook apparatus 1040 become damaged or otherwise unusable, utilizing removable fasteners can allow the hook apparatus 1040 to be removed from the bale splitter 1000 and replaced with a new hook apparatus 1040. As such, maintenance of the bale splitter 1000 can be improved.

Figure 6:
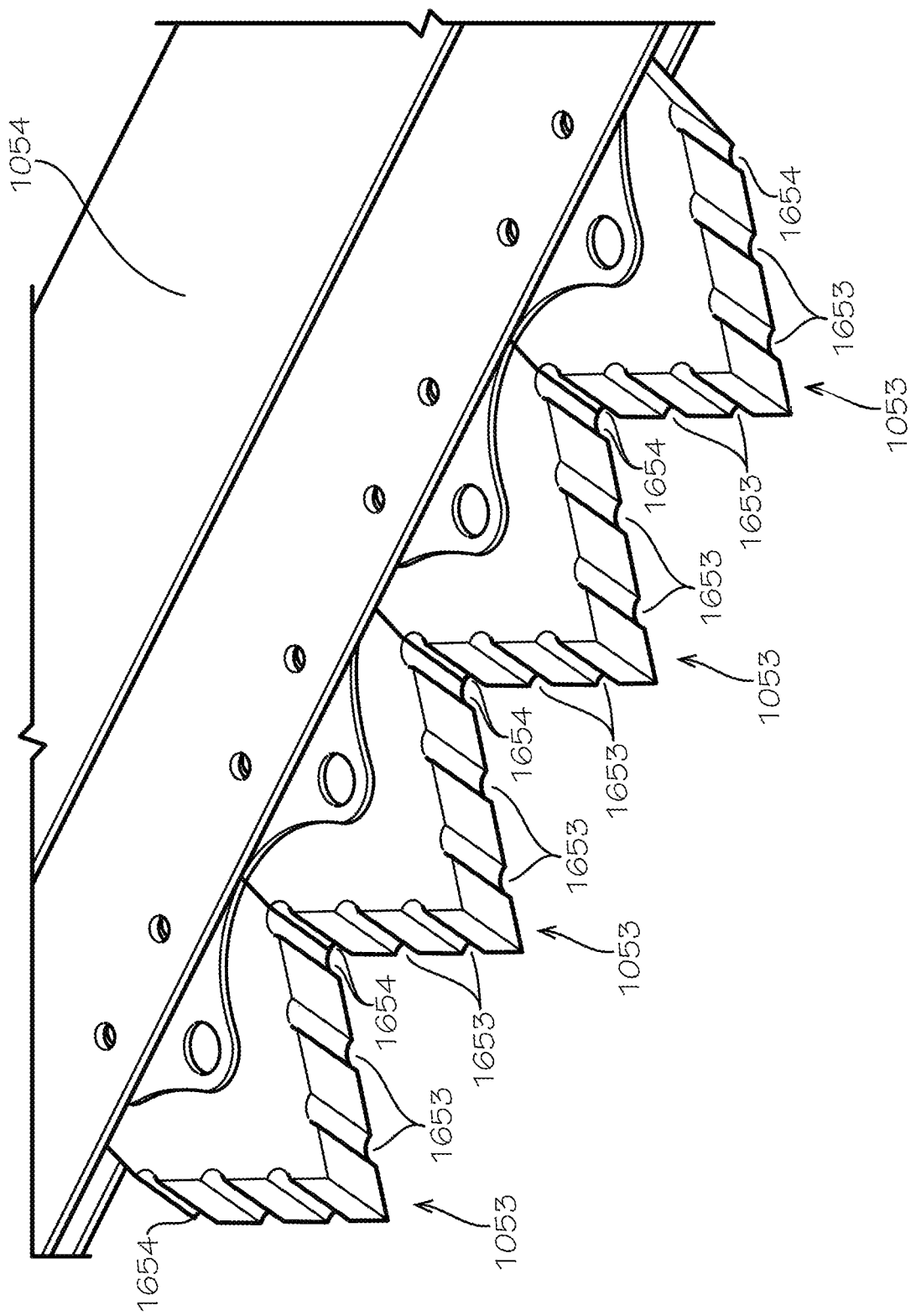
FIG. 6 is a detail perspective view of an elongate blade of the bale splitter attachment of FIG. 1A in accord with one aspect of the current disclosure.

With reference to FIG. 6, the elongate blade 1052 can comprise a plurality of the serrated cutting edges 1053. In the current aspect, each serrated cutting edge 1053 is an independent point, as indicated previously within this disclosure. It would be understood by one of skill in the art that a single elongate blade can be utilized without departing from the scope of the current disclosure.

In the current aspect, each serrated cutting edge 1053 can define a plurality of machined scallops 1653 defined in the sharpened edge. A partial scallop 1654 can be defined at the end of each serrated cutting edge 1053, and each partial scallop 1654 can be arranged to interact with another partial scallop 1654 to define an interaction similar to a scallop 1653. In cutting, the scallops 1653 and the interaction of the partial scallops 1654 can prevent agricultural material from becoming caught in the interaction of the serrated cutting edges 1053. If agricultural material becomes caught or stuck, it can act as a cushion, thereby preventing cutting and requiring excessive cutting force to cut through the bale 2. By including the scallops 1653 and partial scallops 1654, the agricultural material can be efficiently cut without becoming jammed within the interactions of the various serrated cutting edges 1053. It would be understood by one of skill in the art that serrated cutting blades and scallops are not necessary to obtain the objects of the current disclosure, and a skilled artisan may omit these features without straying from the scope of current disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A bale splitter attachment for use with a bale, the bale splitter attachment comprising:
   a frame comprising a frame base and a cutting arm rotatably connected to the frame base at a pivot, the rotatable cutting arm comprising an elongate blade, the frame base and the rotatable cutting arm together defining a bay sized to receive the bale;
   a powered actuation device comprising a first end connected to the frame base and a second end connected to the rotatable cutting arm at a connection point, the powered actuation device configured to apply cutting force in a pulling arrangement; and
   a hook apparatus connected to the frame, the hook apparatus comprising a plurality of hooks, wherein the hook apparatus comprises a plurality of hooks pivotably connected to a frame and rotatably connected to a shuttle, wherein actuation of the powered actuation device linearly engages the shuttle.

2. The bale splitter attachment of claim 1, wherein the frame defines a plurality of mounts configured for attachment to a vehicle.

3. The bale splitter attachment of claim 2, wherein the plurality of mounts define a mount plane, and wherein the bay defines a bale edge plane.

4. The bale splitter attachment of claim 3, wherein the hook apparatus is arranged on the frame base proximate to the bale edge plane.

5. The bale splitter attachment of claim 3, wherein a distance measured orthogonally between the mount plane and the bale edge plane is at most 18 inches.

6. The bale splitter attachment of claim 3, wherein a distance measured orthogonally between the mount plane and the bale edge plane is at most 12 inches.

7. The bale splitter attachment of claim 1, wherein the elongate blade comprises a plurality of serrated cutting edges, each serrated cutting edge defining a plurality of scallops.

8. The bale splitter attachment of claim 7, wherein each serrated cutting edge defines at least one partial scallop.

9. The bale splitter attachment of claim 1, wherein the connection point is arranged with respect to the rotatable cutting arm to provide a maximum mechanical advantage when the elongate blade is proximate a center of the bay.

10. A bale splitter assembly comprising:
    a vehicle, the vehicle comprising a powered actuation system;
    a bale splitter attachment, the bale splitter attachment comprising
       a frame comprising a frame base and a cutting arm rotatably connected to the frame base at a pivot, the rotatable cutting arm comprising an elongate blade, the frame base and the rotatable cutting arm together defining a bay sized to receive the bale;
       a powered actuation device, the powered actuation device receiving power from the powered actuation system of the vehicle, the powered actuation device comprising a first end connected to the frame base and a second end connected to the rotatable cutting arm; and
       a hook apparatus connected to the frame, the hook apparatus comprising a plurality of hooks and a powered actuation device, the powered actuation device of the hook apparatus receiving power from the powered actuation system of the vehicle,
    wherein the hook apparatus comprises a plurality of hooks pivotably connected to a frame and rotatably connected to a shuttle, wherein actuation of the powered actuation device linearly engages the shuttle.

11. The bale splitter assembly of claim 10, wherein actuation of the powered actuation device of the hook apparatus is independently controllable from actuation of the powered actuation device of the rotatable cutting arm.

12. The bale splitter assembly of claim 10, wherein the hook apparatus is arranged vertically proximate to a center of the bay.

\* \* \* \* \*